(12) United States Patent
Fulford et al.

(10) Patent No.: US 6,374,808 B1
(45) Date of Patent: Apr. 23, 2002

(54) POPPET VALVE APPARATUS FOR CONTROLLING FLUID FLOW

(75) Inventors: Mark G. Fulford, Peoria; Michael J. Laible, Washburn, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/315,738

(22) Filed: May 20, 1999

(51) Int. Cl.$^7$ .............................................. F02M 41/00
(52) U.S. Cl. .................. 123/458; 123/514; 251/129.15
(58) Field of Search ................................. 123/458, 514, 123/446, 506; 137/554, 807, 329.05; 251/129.11, 121, 129.21, 129.15

(56) References Cited

U.S. PATENT DOCUMENTS

| | | | | |
|---|---|---|---|---|
| 3,700,005 A | * | 10/1972 | Fletcher et al. ............. 137/862 |
| 4,292,991 A | * | 10/1981 | Wing ..................... 137/329.05 |
| 4,541,385 A | * | 9/1985 | Eheim et al. ................ 123/446 |
| 4,789,132 A | * | 12/1988 | Fujita et al. ............ 251/129.11 |
| 4,884,545 A | * | 12/1989 | Mathis ....................... 123/447 |
| 4,976,404 A | * | 12/1990 | Ichikawa et al. ........... 251/121 |
| 5,109,885 A | * | 5/1992 | Tauscher .................... 137/554 |
| 5,241,991 A | * | 9/1993 | Iorio et al. .................. 137/807 |
| 5,300,259 A | * | 4/1994 | Tashiro ...................... 261/44.3 |
| 5,957,111 A | * | 9/1999 | Rodier ........................ 123/458 |

* cited by examiner

*Primary Examiner*—Carl S. Miller
(74) *Attorney, Agent, or Firm*—Clifton G. Green

(57) ABSTRACT

A one-piece non-magnetic poppet of a first material for controlling fluid flow. The poppet is moves from a first position to a second position. In the first position, the poppet plugs an aperture so as to resist fluid flow through the aperture. In the second position, the poppet is in a position that allows fluid flow through the aperture. The poppet may be coup led directly with an armature disposed within the housing.

12 Claims, 4 Drawing Sheets

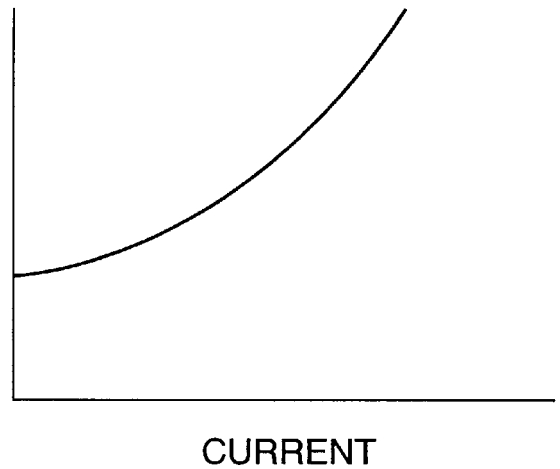
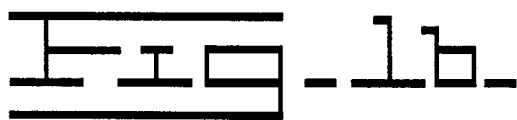
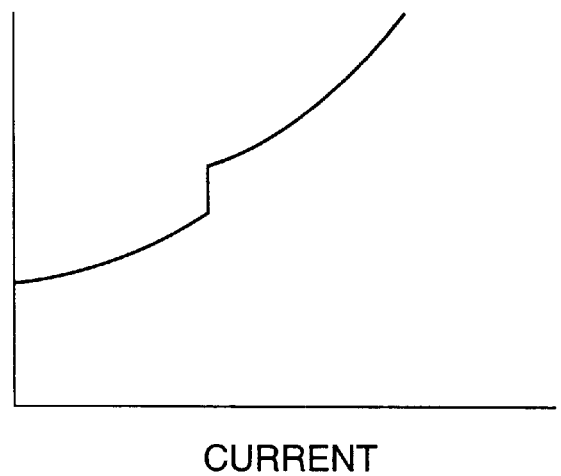

POPPET VALVE APPARATUS FOR CONTROLLING FLUID FLOW

TECHNICAL FIELD

This invention relates generally to an apparatus for controlling fluid flow, and more particularly, to a poppet valve.

BACKGROUND ART

Conventional poppet valve assemblies typically contain a housing, a solenoid coupled with the housing for generating an electromagnetic force, a magnetic armature within the housing that moves in response to the electromagnetic force, a stator that guides a push pin, a cone-shaped poppet, and a seat having an aperture. In operation, the solenoid moves the armature towards the stator, pushing the push pin towards the seat. The push pin is adjacent to the poppet, and pushes the poppet into the aperture of the seat, plugging it. The seat typically includes a poppet guide and has a channel for the flow of fluid through the seat and out of the poppet valve assembly when the aperture is not plugged by the poppet. The poppet is cone-shaped to ensure better alignment and fit with the aperture.

A pressurized fluid is applied to the aperture, and presses against the poppet when the aperture is plugged. If the force exerted by the fluid on the poppet exceeds the force exerted on the poppet by the armature and push pin, the poppet is forced away from the aperture, allowing for fluid flow through the aperture, the channel within the seat, and out of the poppet valve assembly. This typically decreases the pressure of the fluid. When the force exerted by the fluid on the poppet does not exceed the force exerted on the poppet by the armature and push pin, the poppet is pressed against the aperture, plugging it. Thus, by regulating the force with which the poppet presses against the aperture (by regulating the current through the solenoid), the pressure of the fluid may be controlled.

One problem with conventional poppet valve assemblies is that the pressure versus current (of the solenoid) graph is frequently less than ideal. FIG. 1a is a graph of desired pressure versus current for one type of conventional poppet valve assembly. Preferably, a map of pressure versus current will be a smooth, continuous curve or line. However, under certain operating conditions, such as high temperature and medium to high flow rates, the pressure versus current graph in many poppet valve assemblies has a discontinuity: a spike. FIG. 1b is a graph of actual pressure versus current for the one type of poppet valve assembly. At certain operating conditions, for a small increase in current, the pressure of the fluid increases disproportionally. This disproportional increase may cause a discontinuity with systems using the conventional poppet valve assembly, such as a fuel delivery system for an engine.

DISCLOSURE OF THE INVENTION

The present invention provides apparatuses for controlling fluid flow. A one-piece non-magnetic poppet of a first material is operable to be actuated from a first position to a second position. In the first position, the poppet plugs an aperture so as to resist fluid flow through the aperture, and in the second position the poppet is in a position that allows fluid flow through the aperture. The poppet may be coupled directly with an armature disposed within the housing.

BRIEF DESCRIPTION OF THE DRAWINGS

FIG. 1a is a graph of ideal pressure versus current for a conventional poppet valve assembly.

FIG. 1b is a graph of actual pressure versus current for a conventional poppet valve assembly.

BEST MODE FOR CARRYING OUT THE INVENTION

Figure 2:
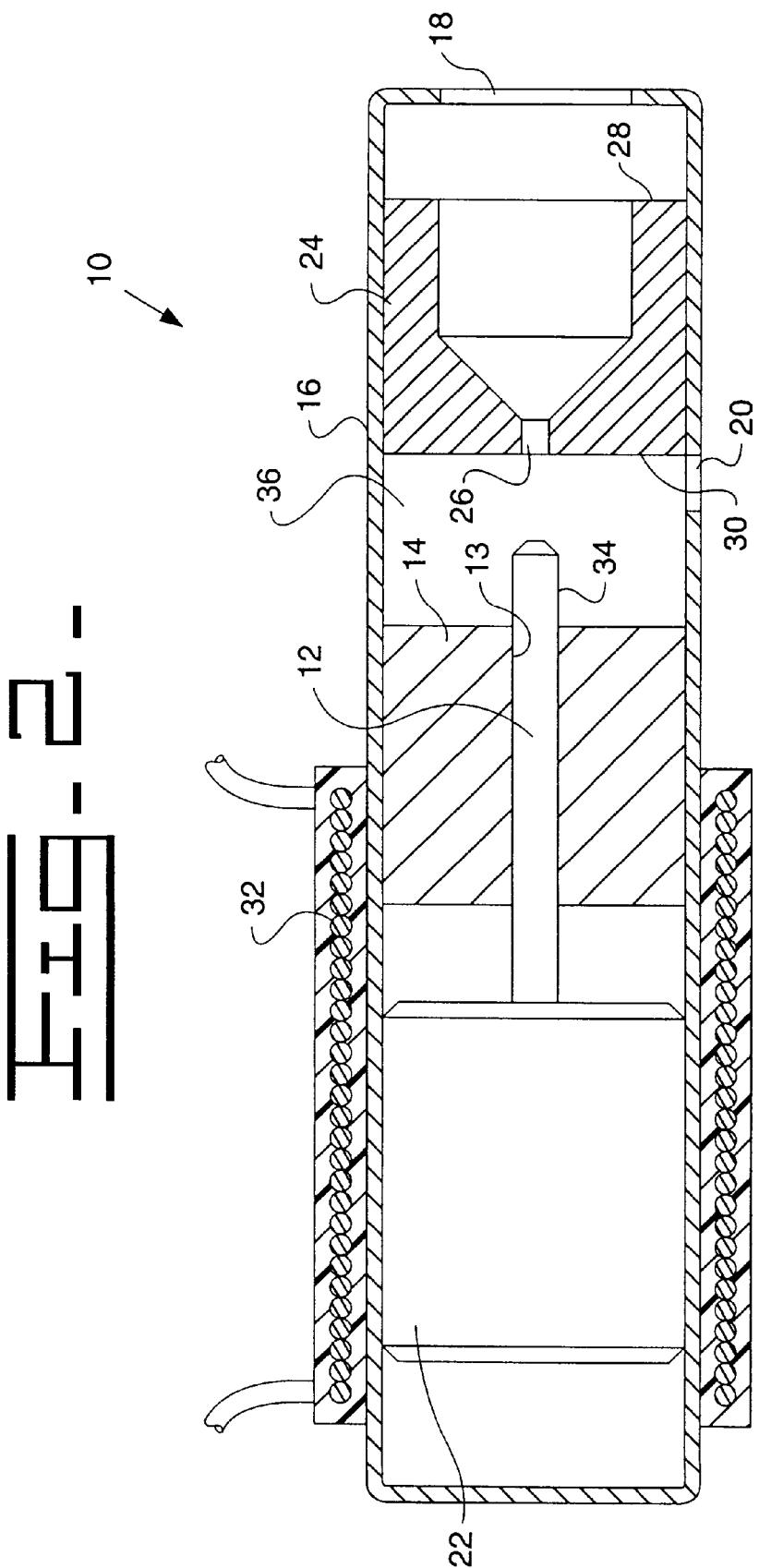
FIG. 2 is a cross-sectional view of a poppet valve assembly according to one embodiment of the invention.

FIG. 2 is a cross-sectional view of a poppet valve assembly 10 according to one embodiment of the invention. A one-piece non-magnetic poppet 12 is located within a channel 13 of a stator 14, which is situated within a housing 16. The channel 13 extends through the stator from a first side to a second side of the stator 14. The housing 16 has a first aperture 18 that can receive a first flow of a fluid (not shown), such as oil, and a second aperture 20 for exhausting the first flow of fluid from the housing 16. An armature 22 made of a magnetic material is located within the housing 16, adjacent to the poppet 12. A seat 24 is located on a side of the stator 14 opposite the armature 22. The seat 24 has a passage 26 for fluid flow from a first side 28 of the seat 24 to a second side 30 of the seat 24. A coil of electrically conductive material for generating an electromagnetic force, such as a wire 32, is coupled with the housing 16; typically around the housing 16, or around a portion of the housing 16. The wire 32 is configured so as to exert an electromagnetic force on the armature 22 in response to a current passing through the wire 32.

Unlike conventional poppet assemblies, the poppet 12 is a single piece, and no push pin is located between the poppet 12 and the armature 22. Instead, the poppet 12 may be within the stator 14 and directly adjacent to the armature 22.

In one embodiment the poppet 12 has a truncated cone at one end 34, the truncated cone being operable to plug the passage 26 as described below.

Figure 3:
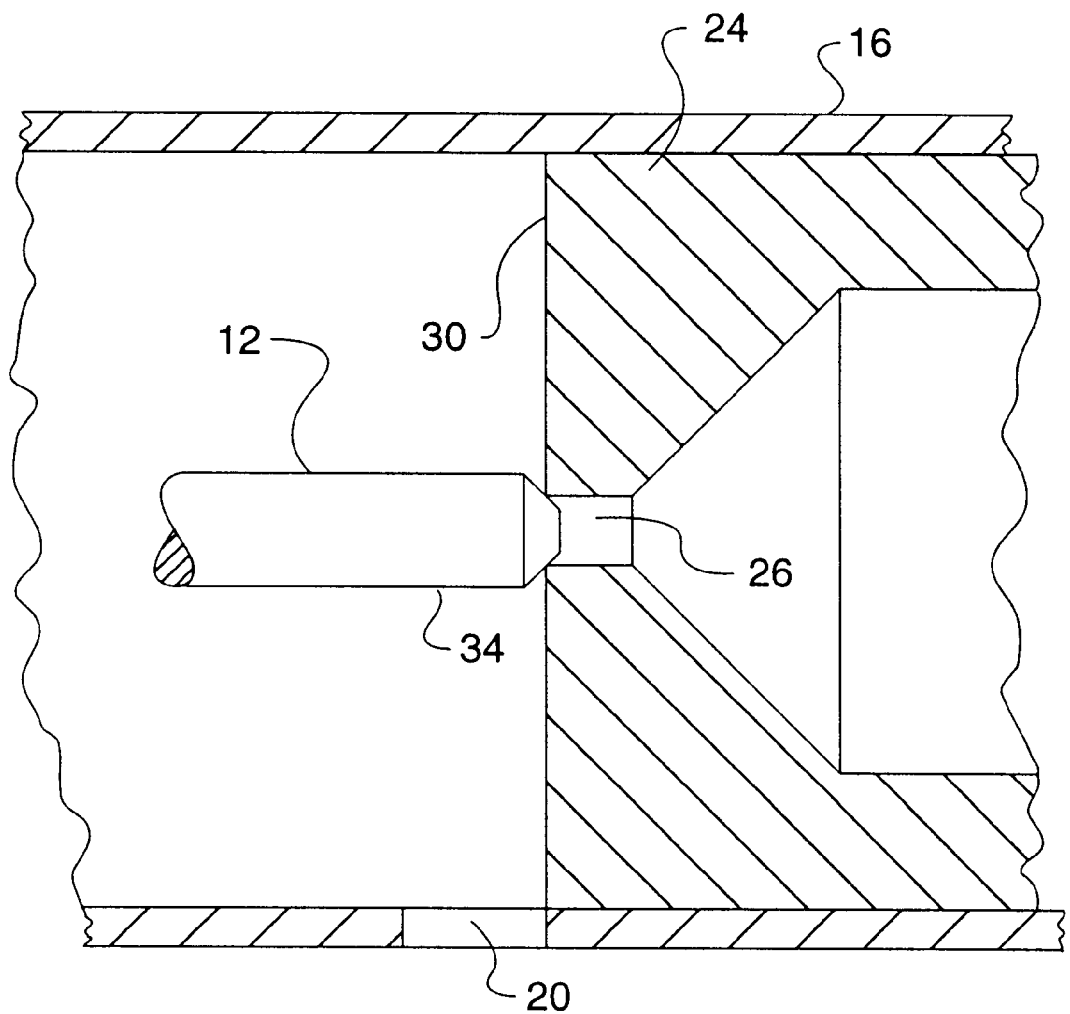
FIG. 3 is a partial cross-sectional view of a poppet valve assembly according to one embodiment of the invention.

In operation, a current excites the coil of wire 32, generating an electromagnetic force that causes the armature 22 to be pushed/pulled towards the stator 14. This movement by the armature 22 pushes the poppet 12 towards the second side 30 of the seat 24. As shown in FIG. 3, in response to an appropriate excitation of the wire 32 known to those skilled in the art, the armature 22 moves the poppet 12 a sufficient distance to plug the passage 26 within the seat 24.

As mentioned above, the poppet 12 is made of a non-magnetic material, and in one embodiment is a ceramic, such as silicon nitride or zirconia, although other ceramics may also be suitable. Ceramic is one of the few non-magnetic materials having a hardness sufficiently high to withstand the operating requirements (pressure and temperature, for example) of many poppet valve assemblies. Even most non-magnetic metals, such as stainless steel, have a hardness that is too low.

The poppet 12 should be non-magnetic in order to function properly. When the wire 32 is excited, the stator 14 becomes magnetic. If the poppet 12 were magnetic it would be attracted to the stator 14 and would likely 'stick' to the stator 14, preventing the poppet 12 from moving smoothly through the stator 14. This attraction between the poppet 12 and stator 14 may even stop the movement of the poppet 12 prior to it plugging the passage 26.

In conventional poppet valve assemblies (not shown) this has led to the use of two-piece poppet assemblies made of a push pin and a poppet. The push pin is disposed within the channel 13 of the stator 14, and is made of a non-magnetic material so as to avoid the problem described above. The poppet is immediately adjacent to the push pin and is outside of the stator 14. The poppet is typically a magnetic metal so as to have the appropriate hardness to withstand the high temperature and pressure of the fluid being controlled by the poppet valve assembly. The drawback to conventional poppet valve assemblies is that a poppet guide is required, typically incorporated into the seat 24, increasing the complexity of the poppet valve assembly. Further, the fluid dynamics may be less than ideal, as described above, in part because of the presence of the poppet guide.

Typically a pressurized fluid, such as oil, enters the housing through the first aperture 18, passes through the passage 26 and against the poppet 12 that is plugging the passage 26. When the oil pressure exerts a force on the end 34 of the poppet 12 that exceeds the force of the armature 22 on the poppet 12, the oil pushes the poppet 12 away from the seat, causing the poppet 12 to push the armature 22 away from the stator 14.

When the poppet 10 is pushed away from the seat 24, the oil flows through a cavity 36 defined by the housing 16, the stator 14, and the seat 24, and out the second aperture 20 of the housing 16. The flow of oil typically reduces the oil pressure. The poppet 10 may move from a position pressing against the seat 24 to a position pressing against the armature 22 when the armature 22 is a maximum distance from the stator 14, or any position in-between.

When the oil pressure is reduced to a degree that it exerts a lesser force on the poppet 12 than the force exerted by the armature 22, the poppet 12 is pushed back against the seat 24, again plugging the passage 26, thereby stopping the flow of oil.

Thus, by controlling the force with which the poppet 12 presses against the seat 24, thereby plugging the passage 26, the pressure of the oil is regulated. If a high oil pressure is desired, an appropriately high current is used to excite the wire 32, causing the armature 22 to exert an appropriately high force on the poppet 12. Similarly, if a low oil pressure is desired, an appropriately low current is used to excite the wire 32, causing the armature 22 to exert an appropriately low force on the poppet 12.

Both the truncated cone on the end 34 of the poppet 12 and the shape of the cavity 36 contribute to improved fluid flow over conventional poppet valve assemblies. For example, the spike in pressure discussed above typically does not occur with the poppet valve assembly 10. In particular, because the poppet 12 is a single piece, the poppet is guided into the passage 26 by the stator 14, and no guide is needed on the seat 24. This allows the seat 24 to have a substantially flush face on the second side 30 of the seat 24, creating a larger cavity 36 having different fluid dynamics than is typically found in conventional poppet valve assemblies. Further, because the seat 24 does not have a poppet guide, the seat design is simpler to fabricate.

Figure 4:
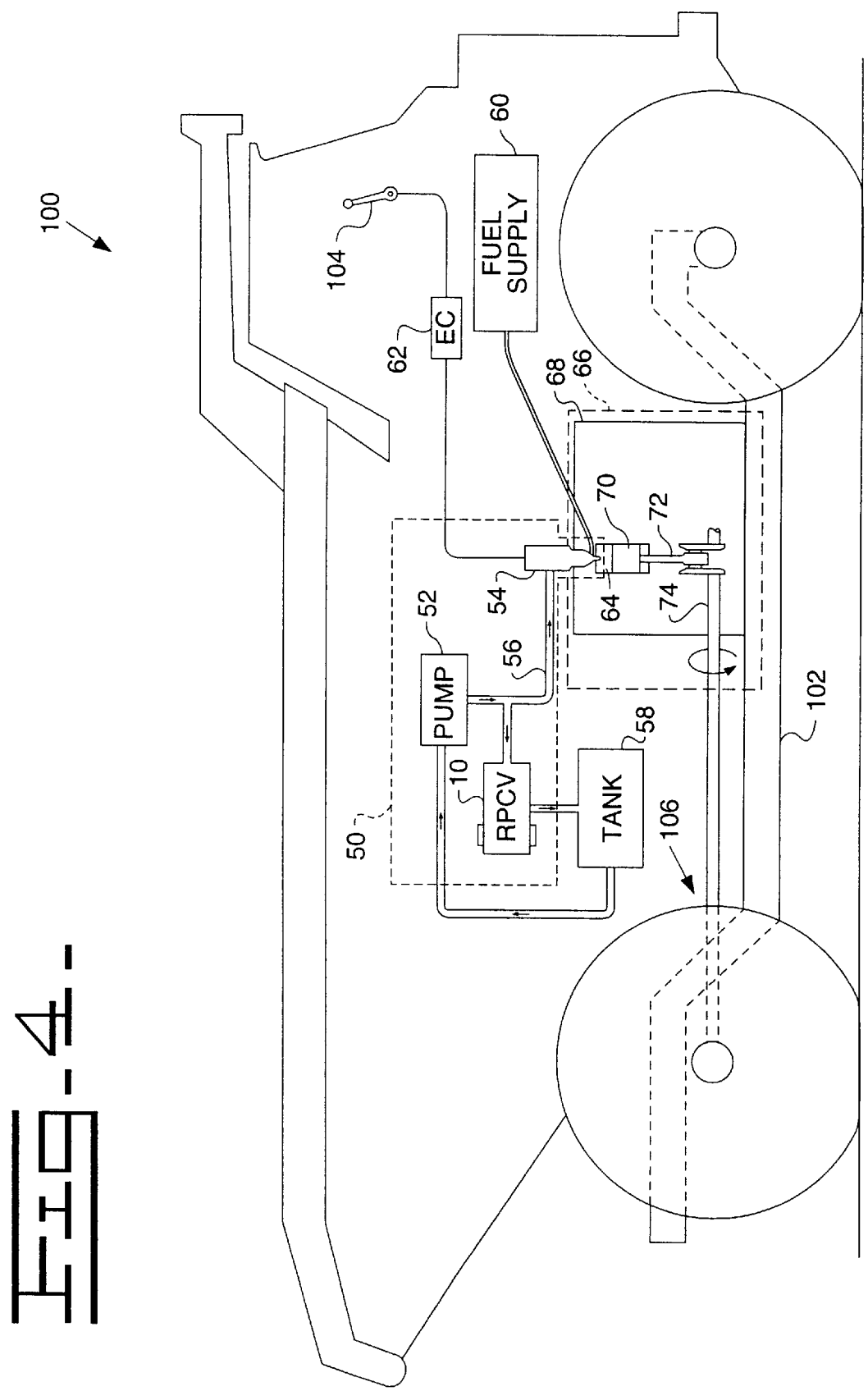
FIG. 4 is a work machine having a fuel system using a poppet valve assembly according to one embodiment of the invention.

As shown in FIG. 4, in one embodiment according to the invention, the poppet valve assembly 10 may be used as an oil pressure control device for a fuel delivery system 50. The fuel delivery system 50 includes a fluid pump 52, the poppet valve assembly 10 as a pressure control valve, such as a rail pressure control valve (RPCV), a hydraulically actuated, electronically controlled fuel injector 54, such as injectors available from Caterpillar Inc. under the trademark HEUI™, and a fluid path 56, known as rails in some applications, coupling the fluid pump 52, the poppet valve assembly 10, and the injector 54.

In operation, the fluid pump 52 draws a first fluid, such as an oil, from a tank 58, for example, and pressurizes the oil to a predetermined pressure. The fluid path 56 delivers the pressurized oil to the injector 54. The injector 54 also receives a fuel from a fuel supply 60, such as a gas tank. In response to receiving a trigger signal from an electronic fuel system controller 62 (EC), the injector 54 uses the pressurized oil to transmit, i.e., inject, a predetermined amount of fuel under pressure to a predetermined location, such as a combustion chamber 64 of an engine 66. The operation and use of a hydraulically actuated, electronically controlled fuel injector is known to those skilled in the art, and further discussion is omitted in the interest of brevity. The poppet valve assembly 10 regulates the pressure of the oil within the fluid path 56, preventing the oil from exceeding a predetermined pressure as described above. The poppet valve assembly 10 may exhaust the oil bled from the fluid path back to the tank 58, or to any other suitable location (not shown).

Although the fuel delivery system described above is illustrated with the single stage poppet valve assembly 10, a two-stage poppet valve assembly (not shown) could also be used. The poppet valve assembly 10 may be used as one or both of the stages.

In one embodiment of the invention, the engine 66 includes an engine block assembly 68, the combustion chamber 64 within the engine block assembly 68, piston 70 within the engine block assembly forming one wall of the combustion chamber 64, a piston rod 72 coupled with the piston 70, a drive shaft 74 coupled with the piston rod 72, and the fuel delivery system 50 described above coupled with the engine 66. The engine block assembly 68 typically includes additional components, such as a path for injection of air into the combustion chamber, a path for the circulation of a cooling medium, such as air or water, and a variety of other components known to those skilled in the art. Because these components are somewhat superfluous to the understanding of the invention, further discussion of them is omitted.

In operation, the fuel delivery system 50 injects a predetermined amount of fuel into the combustion chamber 64 as described above. The piston 70 moves within the engine block assembly 68 into a first position, such as top dead center, increasing the pressure and temperature of the mixture of fuel and air within the combustion chamber 64. When the mixture of fuel and air reaches a certain temperature, they ignite, expanding and forcing the piston 70 and piston rod 72 downward to a second position, such as bottom dead center. This movement by the piston rod 72 causes the drive shaft 74 to rotate. This cycle then repeats. Although the engine described above is a compression ignition engine, the fuel delivery system 50 could also be used with a spark ignition engine.

In one embodiment according to the invention, the engine 66 is part of a work machine 100, such as a truck, tractor, boat, or any of a variety of machines known to those skilled in the art. The work machine 100 typically includes a chassis 102 or hull (not shown) coupled with the engine 66, an input control device such as a throttle lever 104 or gas pedal (not shown) for controlling the engine 66 and coupled with the engine 66, and a propulsion system 106 coupled with the drive shaft 74 and operable to propel the work machine 100 by ways known to those skilled in the art. Typical examples of the propulsion system 106 include a tire, a track, i.e., a continuous belt, and a propeller or jet (not shown), and may include components such a transmission (not shown), torque converter (not shown), and a variety of other components (not shown) known to those skilled in the art.

In operation, the throttle lever 104 sends a throttle signal indicative of a desired engine speed to the electronic fuel system controller 62, which generates the trigger signal as a function of the throttle signal by ways known to those skilled in the art. The electronic fuel system controller 62 transmits the trigger signal to the fuel delivery system 50, which operates as described above. The rotation of the drive shaft 74 causes the propulsion system 106 to propel the work machine 100 in a manner known to those skilled in the art.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel delivery system, comprising:
    a fluid pump operable to pressurize a first fluid to a predetermined pressure;
    a pressure control valve coupled with the fluid pump to receive the pressurized first fluid, the pressure control valve operable to regulate the pressure of the first fluid, the pressure control valve comprising:
        a housing having a first and a second apertures, the first aperture operable to receive the first fluid and the second aperture operable to exhaust the first fluid from the housing;
        a seat disposed within the housing, the seat having a first side and a second side, and a first passage for fluid flow from the first side to the second side, the first passage operable to receive the first flow of fluid;
        a stator disposed within the housing, the stator having a first side and a second side, and a first channel coupling the first side of the stator with the second side, the stator having at least a first portion spaced a predetermined distance from the seat, the at least first portion of the stator and the seat defining a cavity within the housing, the second aperture of the housing coupling the cavity with an exterior of the housing;
        a one-piece non-magnetic poppet of a first material disposed within the housing and at least in part within the channel of the stator, the poppet operable to be actuated from a first position to a second position and from the second position to the first position, the first position being a position that allows a flow of the first fluid through the passage in the seat, and the second position being a position that restricts the flow of the first fluid through the passage in the seat;
        an armature disposed within the housing, the armature operable to directly actuate the poppet from the first position to the second position in response to the armature moving from a third position to a fourth position; and
        a coil of an electrically conductive material coupled with the housing, the coil operable to move the armature from the third position to the fourth position in response to receiving a current;
    a hydraulically actuated fuel injector operable to receive the first fluid, a fuel, and a trigger signal, the injector operable to transmit a predetermined amount of the fuel in response to the trigger signal and as a function of the pressurized first fluid;
    a fluid path coupled with the fluid pump, the pressure control valve, and the injector, the fluid path operable to transmit the first fluid from the fluid pump to the pressure control valve and the injector.

2. The device of claim 1 wherein the first material comprises a ceramic.

3. The device of claim 1 wherein the poppet includes a first end and a second end, the first end having a truncated cone, and the first end is operable to plug the passage of the seat when the poppet is in the second position.

4. The device of claim 1 wherein the second side of the seat includes a substantially flush face, the second side being in physical contact with the poppet when the poppet is in the second position.

5. An engine, comprising:
    an engine block assembly having a combustion chamber;
    a fuel injector coupled with the engine block assembly, the fuel injector operable to receive a trigger signal, a fuel, and a pressurized oil, and to inject a predetermined amount of the fuel into the combustion chamber in response to the trigger signal and the oil having a predetermined pressure;
    a piston disposed within the engine block assembly and forming a wall of the combustion chamber, the piston operable to move between a first and a second position within the engine block assembly, and operable to cause combustion of fuel in the combustion chamber in response to the piston moving from the second position to the first position;
    a piston rod coupled with the piston, the piston rod operable to move between a third and a fourth position in response to the piston moving between the first and second position;
    a drive shaft coupled with the piston, the drive shaft operable to rotate in response to the piston rod moving between the third and fourth position;
    an oil pressure control device coupled with the fuel injector, the device operable to bleed a portion of the oil to a predetermined location, thereby reducing the oil pressure to a predetermined value, the device comprising:
        a housing having a first and a second apertures, the first aperture operable to receive a first flow of fluid and the second aperture operable to exhaust the first flow of fluid from the housing to the predetermined location;
        a seat disposed within the housing, the seat having a first side and a second side, and a first passage for fluid flow from the first side to the second side, the first passage operable to receive the first flow of fluid;
        a stator disposed within the housing, the stator having a first side and a second side, and a first channel coupling the first side of the stator with the second side, the stator having at least a first portion spaced a predetermined distance from the seat, the at least first portion of the stator and the seat defining a cavity within the housing, the second aperture of the housing coupling the cavity with an exterior of the housing;
        a one-piece non-magnetic poppet of a first material disposed within the housing and at least in part within the channel of the stator, the poppet operable to be actuated from a first position to a second position and from the second position to the first position, the first position being a position that allows the flow of fluid through the passage in the seat, and the second position being a position that restricts the flow of fluid through the passage in the seat;

an armature disposed within the housing, the armature operable to directly actuate the poppet from the first position to the second position in response to the armature moving from a third position to a fourth position; and a coil of an electrically conductive material coupled with the housing, the coil operable to move the armature from the third position to the fourth position in response to receiving a current;

a fluid pump coupled with the oil pressure control device and the fuel injector, the fluid pump operable to provide pressurized oil to the oil pressure control device and the fuel injector.

6. The device of claim 5 wherein the first material comprises a ceramic.

7. The device of claim 5 wherein the poppet includes a first end and a second end, the first end having a truncated cone, and the first end is operable to plug the passage of the seat when the poppet is in the second position.

8. The device of claim 5 wherein the second side of the seat includes a substantially flush face, the second side being in physical contact with the poppet when the poppet is in the second position.

9. A work machine comprising:

a chassis;

an input control device, the input control device operable to receive an input and to transmit a trigger signal as a function of the input;

an engine coupled with the chassis, comprising:

an engine block assembly having a combustion chamber;

a fuel injector coupled with the input control device and the engine block assembly, the fuel injector operable to receive the trigger signal from the input control device, a fuel, and a pressurized oil, and to inject a predetermined amount of the fuel into the combustion chamber in response to the trigger signal and the oil having a predetermined pressure;

a piston disposed within the engine block assembly and forming a wall of the combustion chamber, the piston operable to move between a first and a second position within the engine block assembly, and operable to cause combustion of fuel in the combustion chamber in response to the piston moving from the second position to the first position;

a piston rod coupled with the piston, the piston rod operable to move between a third and a fourth position in response to the piston moving between the first and second position;

a drive shaft coupled with the piston, the drive shaft operable to rotate in response to the piston rod moving between the third and fourth position;

an oil pressure control device coupled with the fuel injector, the device operable to bleed a portion of the oil to a predetermined location, thereby reducing the oil pressure to a predetermined value, the device comprising:

a housing having a first and a second apertures, the first aperture operable to receive a first flow of fluid and the second aperture operable to exhaust the first flow of fluid from the housing to the predetermined location;

a seat disposed within the housing, the seat having a first side and a second side, and a first passage for fluid flow from the first side to the second side, the first passage operable to receive the first flow of fluid;

a stator disposed within the housing, the stator having a first side and a second side, and a first channel coupling the first side of the stator with the second side, the stator having at least a first portion spaced a predetermined distance from the seat, the at least first portion of the stator and the seat defining a cavity within the housing, the second aperture of the housing coupling the cavity with an exterior of the housing;

a one-piece non-magnetic poppet of a first material disposed within the housing and at least in part within the channel of the stator, the poppet operable to be actuated from a first position to a second position and from the second position to the first position, the first position being a position that allows the flow of fluid through the passage in the seat, and the second position being a position that restricts the flow of fluid through the passage in the seat;

an armature disposed within the housing, the armature operable to directly actuate the poppet from the first position to the second position in response to the armature moving from a third position to a fourth position; and a coil of an electrically conductive material coupled with the housing, the coil operable to move the armature from the third position to the fourth position in response to receiving a current;

a fluid pump coupled with the oil pressure control device and the fuel injector, the fluid pump operable to provide pressurized oil to the oil pressure control device and the fuel injector; and a propulsion system coupled with the drive shaft and operable to propel the operating machine as a function of the rotation of the drive shaft.

10. The device of claim 9 wherein the first material comprises a ceramic.

11. The device of claim 9 wherein the poppet includes a first end and a second end, the first end having a truncated cone, and the first end is operable to plug the passage of the seat when the poppet is in the second position.

12. The device of claim 9 wherein the second side of the seat includes a substantially flush face, the second side being in physical contact with the poppet when the poppet is in the second position.

* * * * *